(12) United States Patent
Maertens

(10) Patent No.: US 10,648,386 B2
(45) Date of Patent: May 12, 2020

(54) PROCESS FOR OPTIMIZING A REMOVAL OF NITROGEN OXIDES FROM THE GASES IN AN ENGINE EXHAUST LINE ACCORDING TO A SELECTIVE CATALYTIC REDUCTION

(71) Applicants: Continental Automotive France, Toulouse (FR); Continental Automotive GmbH, Hannover (DE)

(72) Inventor: Steven Maertens, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/339,037

(22) PCT Filed: Nov. 24, 2017

(86) PCT No.: PCT/FR2017/053249
§ 371 (c)(1),
(2) Date: Apr. 3, 2019

(87) PCT Pub. No.: WO2018/096292
PCT Pub. Date: May 31, 2018

(65) Prior Publication Data
US 2020/0040786 A1 Feb. 6, 2020

(30) Foreign Application Priority Data
Nov. 25, 2016 (FR) .................................... 16 61490

(51) Int. Cl.
*F01N 3/20* (2006.01)
*F01N 9/00* (2006.01)
*F01N 11/00* (2006.01)

(52) U.S. Cl.
CPC .............. *F01N 3/208* (2013.01); *F01N 9/00* (2013.01); *F01N 11/00* (2013.01);
(Continued)

(58) Field of Classification Search
CPC combination set(s) only.
See application file for complete search history.

(56) References Cited

U.S. PATENT DOCUMENTS 6,487,851 B1 * 12/2002 Okada ................. F02D 41/0275
60/285
6,629,453 B1 * 10/2003 Surnilla ................ F01N 3/0814
73/114.71
(Continued)

FOREIGN PATENT DOCUMENTS

| EP | 3073080 A1 | 9/2016 |
| WO | 2008006984 A1 | 1/2008 |

OTHER PUBLICATIONS

International Search Report and Written Opinion for International Application No. PCT/FR2017/053249, dated Feb. 7, 2018—8 pages.
(Continued)

*Primary Examiner* — Binh Q Tran
(74) *Attorney, Agent, or Firm* — RatnerPrestia

(57) ABSTRACT

A process for optimizing a depollution of nitrogen oxides from the gases in an engine exhaust line carried out according to a selective catalytic reduction by injection of a quantity of reducing agent into the line makes it possible to monitor a setpoint of the amount of nitrogen oxides per second at the outlet of the line. A readjustment of the setpoint is made at each completion of successive running distance intervals determined by integration of the speed over a time interval that ends as soon as a predetermined target cumulative amount of carbon dioxide released is reached, an amount of nitrogen oxides at the outlet per kilometer traveled being calculated for each interval from a cumulative
(Continued)

amount of nitrogen oxides measured at the outlet and compared with a target amount of nitrogen oxides per kilometer for the calculation of a deviation used for the readjustment of the setpoint.

13 Claims, 1 Drawing Sheet

(52) U.S. Cl.
CPC .... *F01N 2560/026* (2013.01); *F01N 2570/14* (2013.01); *F01N 2610/02* (2013.01); *F01N 2610/146* (2013.01); *F01N 2900/0411* (2013.01); *F01N 2900/102* (2013.01); *F01N 2900/1402* (2013.01)

(56) References Cited

U.S. PATENT DOCUMENTS

| | | | | |
|---|---|---|---|---|
| 7,845,165 | B2* | 12/2010 | Satou | B01D 53/944 |
| | | | | 60/295 |
| 2001/0044687 | A1* | 11/2001 | Mitani | B60W 30/188 |
| | | | | 701/54 |
| 2010/0024389 | A1 | 2/2010 | Gady et al. | |
| 2015/0167521 | A1* | 6/2015 | Sakurai | F01N 3/0842 |
| | | | | 422/105 |
| 2016/0281568 | A1* | 9/2016 | Kiyofuji | F01N 3/2066 |

OTHER PUBLICATIONS

English Translation of the Written Opinion for International Application No. PCT/FR2017/053249, dated Feb. 7, 2013—7 pages.

* cited by examiner

PROCESS FOR OPTIMIZING A REMOVAL OF NITROGEN OXIDES FROM THE GASES IN AN ENGINE EXHAUST LINE ACCORDING TO A SELECTIVE CATALYTIC REDUCTION

CROSS REFERENCE TO RELATED APPLICATIONS

This application is the U.S. National Phase Application of PCT International Application No. PCT/FR2017/053249, filed Nov. 24, 2017, which claims priority to French Patent Application No. 1661490, filed Nov. 25, 2016, the contents of such applications being incorporated by reference herein.

FIELD OF THE INVENTION

The present invention relates to a process for optimizing a depollution of nitrogen oxides from the gases in an internal combustion engine exhaust line of a motor vehicle, the depollution of nitrogen oxides being carried out according to a selective catalytic reduction by injection of a quantity of reducing agent into the line with monitoring of a setpoint of the amount of nitrogen oxides per second at the outlet of the exhaust line.

BACKGROUND OF THE INVENTION

More than 95% of diesel engines will be equipped with a device for treating nitrogen oxides in the exhaust line. This will apply in the very near future to gasoline fuel engines.

In order to do this, in motor vehicles, in particular with a diesel engine, it is known to equip an internal combustion engine exhaust line with a selective catalytic reduction system having injection of reducing agent into the line, the monitoring-control unit receiving the estimates or measurements of amounts of nitrogen oxides exiting through the exhaust line at least downstream of the selective catalytic reduction system.

For the removal of nitrogen oxides or NOR, a selective catalytic reduction (SCR) system is therefore frequently used. Hereinafter in the present application, the selective catalytic reduction system could also be referred to by its abbreviation SCR, likewise the nitrogen oxides could be referred to under their abbreviation NOR, ammonia under its chemical formula $NH_3$ and carbon dioxide under its chemical formula $CO_2$.

In an SCR system, use is made of a liquid reducing agent intended to be introduced in predefined amounts and by consecutive injections into an exhaust line of a motor vehicle. The addition of this depolluting reducing agent treats the $NO_x$ present in the exhaust line of the heat engine of the motor vehicle. This SCR reducing agent is frequently ammonia or an ammonia precursor, for example urea or a urea derivative, in particular a mixture known under the brand Adblue®.

An SCR system typically has a tank containing an amount of liquid reducing agent, a pump for supplying liquid reducing agent to an exhaust line of a motor vehicle using an injector that opens into the exhaust line. The liquid reducing agent decomposes to give gaseous ammonia, of chemical formula $NH_3$. The $NH_3$ is stored in an SCR catalyst in order to reduce the $NO_x$ that are in the gases discharged by the exhaust line. This applies both for diesel vehicles and for gasoline vehicles.

Such an SCR system may be doubled or combined with one or more active or passive $NO_x$ traps. Typically, such traps store the $NO_x$ at colder exhaust temperatures. Next, the $NO_x$ are reduced, during a purging operation, under conditions of richness and heat in the presence of hydrocarbons in the exhaust. For higher temperatures, a continuous injection of fuel into the exhaust line at high frequency and under high pressure has proved more efficient than the typical alternating storage and purging operations.

An SCR system, more particularly when the reducing agent is a urea derivative such as AdBlue®, is effective between medium and high temperatures and may convert the $NO_x$ continuously. An optimized control is also required for increasing the $NO_x$ treatment efficiency and optimizing the consumptions of fuel and of reducing agent, given that these parameters are all dependent, nonlinearly, on the conditions prevailing in the exhaust and during the catalysis.

The control of an SCR system may be divided into two parts: a nominal control and an adaptive control. The nominal control sets the amount of reducing agent to be injected which is calibrated as a function of the SCR system and of the test vehicle used during the development. The adaptive control sets a multiplying correction factor for the amount of reducing agent to be injected based for the vehicle on which the SCR system is actually associated, in order to adapt the system in series with deviations and dispersions that may originate from the reducing agent injector, from the $NO_x$ sensors, from the quality of reducing agent, from the metering system, from the catalysis system or from the exhaust flow rate, etc.

It should also be taken into account that the system may have an influence on the reduction process by giving rise to more emissions of $NO_x$ or of $NH_3$, the $NH_3$ corresponding to the reducing agent converted but not used for the catalysis at the outlet of the exhaust line. Generally, the adaptive control uses an $NH_3$ sensor and/or $NO_x$ sensor or works with an estimate at the outlet of an SCR-impregnated particulate filter or of an SCR catalyst, this without taking into account the case where an auxiliary SCR system is present or if there is present a catalyst for oxidation of the excess $NH_3$ not used for the monitoring of the catalysis at the end of the exhaust line in order to avoid releasing $NH_3$ into the environment outside of the motor vehicle.

A control of an SCR system according to the prior art enables an adaptation of a predetermined $NO_x$ treatment efficiency according to a volume ratio or a weight concentration or a level of $NO_x$ in the exhaust line, for example a mass flow rate in grams/second. If the latter is not expressly formulated in the prior art, it is however obvious to modify a control of $NO_x$ efficiency into control of the level of $NO_x$ in the exhaust line.

With reference to FIG. 1, this figure shows a logic diagram for control of an SCR system, steps 1 to 7 of which are known from the prior art. To carry out the steps, it is known to control an SCR system, which may be done by a monitoring-control unit specifically associated with this SCR system.

The monitoring-control unit operates by setting a setpoint of the amount of nitrogen oxides per second at the outlet of the exhaust line, referenced 1 in FIG. 1. The monitoring-control unit of the SCR system also calculates an amount of reducing agent 2 to be injected into the exhaust line depending on the parameters of the exhaust line and/or on the combustion parameters in the internal combustion engine, which is symbolized by the reference 3 in FIG. 1. This calculation may be carried out in an open loop, which is symbolized by the reference 5 in FIG. 1.

These parameters, in step 3, which may be taken individually or in combination, may be an amount of nitrogen oxides measured or estimated upstream of the injection of reducing agent, advantageously measured by a nitrogen oxide sensor upstream of the injection of reducing agent, a temperature in the exhaust line, a gas flow rate in the exhaust line. In addition, the amount of reducing agent injected may be adjusted by a catalysis model, which is referenced 4 in FIG. 1.

The monitoring-control unit also receives the estimates or measurements of amounts of nitrogen oxides exiting via the exhaust line at least downstream of the selective catalytic reduction system, which is referenced 6 in FIG. 1. This may be carried out by a nitrogen oxide sensor positioned downstream of the catalyst of the SCR system.

The comparison between the setpoint of the amount of nitrogen oxides per second and the estimate or measurement of the amount of nitrogen oxides exiting the exhaust line given per second enables the calculation of a deviation 7 used for correcting the amount of reducing agent 2. This may be given for example in grams per second.

For legislative standards to come in the near future, measurements of emissions under real driving conditions will be introduced. In particular, for diesel vehicles, the emissions measured by a portable emissions measurement system (PEMS) will be possible for a vehicle following random driving cycles under certain conditions making them representative of normal driving conditions.

However, in comparison with the old legislative standards for which only tests on a running bed under standard ambient conditions at a minimum weight and following a predefined speed profile were required, the new standards introduce many more operating conditions in terms of speed, involving speed levels and speed variations, varied ambient conditions, for example cold, hot or at altitude, varying dynamic parameters, such as the wind, slope of the road, air conditioning, etc., as well as vehicle weight variations varying from a minimum weight to a weight that reaches 90% of the maximum weight required by the manufacturer, etc.

This cannot be monitored with a monitoring-control unit according to the prior art described above.

For example, taking as a nonlimiting example a real driving emissions (RDE) standard, this new standard, coming into force in Europe, proposes calculating the emissions of pollutants, mainly nitrogen oxides NOR, carbon monoxide or CO, carbon dioxide or $CO_2$ and particles of various species and of various diameters grouped together under the abbreviation PM under normal driving behavior in accordance with two different processes.

The first process is referred to as moving averaging windows (MAW). Such a first process evaluates the $CO_2$ emissions over a representative evaluation window, by integration of the $CO_2$ and uses the $CO_2$ emissions given in grams per kilometer or g/km to standardize the real driving emissions results, by excluding so-called aberrant values that are too low or too high of more or less 50% of the $CO_2$ emission values.

A second process uses the power measured for a classification according to power classes which have predetermined weight factors.

The two processes give NOR emissions expressed in g/km, derived from NOR emissions in grams divided by the distance in kilometers in the case of the first process, and derived from NOR emissions expressed in grams per second and divided by an average speed in kilometers per second, the two over power classes for the second process.

By referring to the first process which currently appears to be the process accepted for the tests of real driving emissions, a slightly higher or lower concentration or an exhaust mass flow rate of $CO_2$ will not have an impact on the results of NOR in g/km, given that this modifies the distance in proportion to the variation in mass of NOR over the distance.

All the dispersion elements, such as the wind, the slope of the road, the driving style, the weight of the vehicle, the operation of air conditioning, etc., will have, in addition to the $CO_2$ emissions and the exhaust gas flow rate, an impact on the observed NOR emissions. However, as the NOR emissions at the outlet of the exhaust line are monitored at a given point in grams per second or g/sec in accordance with the prior art relating to the monitoring of the NOR, these dispersion elements will not have an impact on the results of NOR in g/km.

However, the NOR results are a function of a variation of an average vehicle speed over the associated distance window. For example, a more aggressive driving style may lead to higher flow rates and also to higher emissions of $CO_2$ and NOR. On the other hand, a higher average speed of the vehicle will result in lower emissions of NOR and in an overconsumption of reducing agent.

Moreover, a higher weight may lead to a higher flow rate of exhaust gas and to higher emissions of $CO_2$ and NOR at a lower average speed which will result in a greater concentration of NOR, in other words in not meeting the requirements of the legislative standards.

Thus, in accordance with the approach according to the prior art and considering the influences mentioned above, a scenario will be defined, in the worst case, that is typically statistically representative of at least 95% of all possible cases of real driving emissions, given that 100% of the cases will never be covered. This scenario will be calibrated in terms of concentration of $NO_x$ at the end of the exhaust line in milligrams per second or mg/sec in order to meet the requirements of the real driving emissions tests, for example lower average speeds combined with higher weight and aggressive driving.

In summary, the remaining problems are, as was mentioned above, to cover at least 95% of the cases in terms of meeting $NO_x$ emission conditions, which results in an overconsumption of reducing agent.

Another problem relates to the calibrations of the engine and of the drive train which must consider all the operating conditions that will be included in the real driving emissions conditions. Not all possible cycles can be covered during the development effectively, for example the worst-case scenario of covering 95% of all possible driving cases. There is then a risk that some of the real driving emissions cycles may exceed the $NO_x$ emission limits for some of the random conditions and driving behaviors or a risk of other conditions that may vary during the real driving emissions tests. This requires the creation of a safety margin that leads to a greater consumption of reducing agent or to the use of catalysts of larger size for example.

SUMMARY OF THE INVENTION

The problem at the root of the present invention is to adapt the monitoring and control of the amounts of reducing agent to be injected into the exhaust line by a selective catalytic reduction system under real operating conditions of the motor vehicle, in particular to meet the requirements of the real driving emissions tests.

For this purpose, an aspect of the present invention relates to a process for optimizing a depollution of nitrogen oxides from the gases in an internal combustion engine exhaust line of a motor vehicle, the depollution of nitrogen oxides being carried out according to a selective catalytic reduction by injection of a quantity of reducing agent into the line making it possible to monitor a setpoint of the amount of nitrogen oxides per second at the outlet of the exhaust line, characterized in that a readjustment of the setpoint of the amount of nitrogen oxides per second at the outlet of the exhaust line is made at each completion of successive running distance intervals, each distance interval being determined by integration of the speed of the vehicle over a time interval that ends as soon as a predetermined target cumulative amount of carbon dioxide released in the exhaust line is reached, an amount of nitrogen oxides at the outlet of the exhaust line per kilometer traveled being calculated for each interval from a cumulative amount of nitrogen oxides measured at the outlet of the exhaust line and compared with a target amount of nitrogen oxides per kilometer for the calculation of a first deviation that is used for the readjustment of the setpoint of the amount of nitrogen oxides per second at the outlet of the exhaust line.

The technical effect is to enable a regulation that increases or decreases the setpoint of $NO_x$ at the outlet of the exhaust line, according to the distances traveled and no longer as a function of time periods.

By taking into account the real driving conditions, in particular by considering target amounts of carbon dioxide and nitrogen oxides per kilometer, the implementation of the process according to an aspect of the invention makes it possible to optimize the injection of reducing agent, if necessary by reducing the overconsumptions of reducing agent and also by reducing the size of the catalysts used with a safety margin. Specifically, in the prior art, it was necessary to provide a safety margin so that the catalytic reduction is effective even in the worst case vehicle running scenario.

As various scenarios can be differentiated by the process in accordance with an aspect of the invention, the injection monitors as closely as possible the real operating conditions of the vehicle as well as the external parameters influencing the consumption of reducing agent, the real conditions and the external parameters being taken into account for determining the target amount of nitrogen oxides per kilometer.

The predetermined target cumulative amount of carbon dioxide released in the exhaust line at each distance interval enables the determination of the end of the time interval used for the integration of the speed of the vehicle, this target amount also being dependent on the running conditions of the vehicle.

Advantageously, the target amount of nitrogen oxides per kilometer is dependent on at least one of the following parameters: driving style, estimation of the total weight of the vehicle, use of additional equipment in the vehicle such as air conditioning, road profile, engine temperature or coolant temperature, vehicle speed, combustion mode and atmospheric conditions such as the outside temperature, the ambient pressure, the wind and/or the altitude.

Advantageously, a cumulative amount of carbon dioxide is estimated by mapping established at least as a function of the engine speed and of a demand for injection of fuel by the driver and is compared to the predetermined cumulative amount of carbon dioxide.

The carbon dioxide or $CO_2$ model may be a basic mapping giving the concentration of $CO_2$, for example the weight concentration as a function of the engine speed and torque. Additional mappings that are functions of the temperature of the coolant, of the combustion mode and of any other parameter having an effect on the concentration of $CO_2$ may also be considered.

The concentration of $CO_2$ at the outlet of the exhaust line may be evaluated every second and may be multiplied by the exhaust mass flow rate in order to be expressed in milligrams per second, which may be integrated to obtain a mass of $CO_2$ in grams over a given time period.

Advantageously, a monitoring of the nitrogen oxide emissions is carried out for evaluation windows over a predetermined running distance, the successive running distance intervals being between a twentieth and a tenth of the predetermined running distances of the evaluation windows.

This is particular advantageous for meeting the conditions required during tests with real driving emissions. A distance is determined by integrating the speed of the vehicle by basing it on a model of maximum carbon dioxide production. The model of carbon dioxide production may be selected in order to be suitable for the size of an emission evaluation window for a real driving emissions test, therefore to adapt the integrated distance interval in order that it is significantly smaller than the distance of an evaluation window, in order to enable a greater reactivity of the monitoring-control of injection of reducing agent under the test conditions.

It is the choice of the predetermined target cumulative amount of carbon dioxide released in the exhaust line that makes it possible to select distance intervals compatible with a test evaluation window, these distance intervals advantageously representing a fraction of the test evaluation window.

A test evaluation window may typically be of the order of 10 km and a distance interval according to an aspect of the present invention may be from 500 m to 1 km, without this being limiting. Such a distance interval makes it possible to suitably monitor the $NO_x$ emissions according to the estimation process according to an aspect of the present invention.

Advantageously, the cumulative amount of carbon dioxide released in the exhaust line is reset to zero at the beginning of each running distance interval. The distance intervals are thus independent of one another with final accumulation of the amounts of nitrogen oxides at the end of the exhaust line.

Advantageously, the amount of reducing agent injected is calculated according to parameters of the exhaust line and/or of combustion in the internal combustion engine taken individually or in combination such as the amount of nitrogen oxides measured or estimated upstream of the injection of reducing agent, the temperature in the exhaust line, the gas flow rate in the exhaust line and the catalysis model.

Advantageously, the calculation of the amount of reducing agent is carried out in an open loop.

Advantageously, at the same time as the readjustment of the setpoint of the amount of nitrogen oxides per second at the outlet of the exhaust line, for a same setpoint of the amount of nitrogen oxides per second at the outlet of the exhaust line, the calculation of a second deviation between the setpoint of the amount of nitrogen oxides per second and a measured or estimated amount of nitrogen oxides at the outlet of the exhaust line per second is carried out, the amount of reducing agent injected also being corrected according to this second deviation.

According to an aspect of the present invention, two deviations for the readjustment of the amount of reducing agent injected may thus be provided. The first deviation, an essential feature of an aspect of the present invention, is used for a readjustment of the setpoint of amount of nitrogen oxides per second at the outlet of the exhaust line over a distance interval, starting from an amount of nitrogen oxides in grams per kilometer. The second deviation, known from the prior art, is used for a readjustment of the amount of reducing agent injected over a time period, for example one second, as a function of an amount of nitrogen oxides over this time period at the outlet of the exhaust line, therefore for example in grams per second.

However, the combination of these two readjustments produces a synergy that enables a better monitoring of the depollution of nitrogen oxides. The second readjustment may be carried out more frequently than the first readjustment but does not directly take into account the running conditions, in particular external conditions and driving style, which the first readjustment does make it possible to increase or decrease the $NO_x$ emissions at the outlet of the exhaust line by readjustment of the setpoint. There is therefore a very strong complementarity between these two types of readjustment of the amount of reducing agent injected.

An aspect of the present invention also relates to an assembly of an exhaust line and of a depollution monitoring-control unit, the exhaust line comprising a selective catalytic reduction system with injection of reducing agent into the line, the monitoring-control unit receiving the estimates or measurements of amounts of nitrogen oxides exiting via the exhaust line at least downstream of the selective catalytic reduction system, characterized in that it carries out such a process for optimizing the amount of reducing agent injected, the monitoring-control unit comprising means for integrating the speed of the vehicle in order to determine a distance interval, means for estimating or calculating a cumulative amount of carbon dioxide released in the exhaust line, means for prior storage of target amounts of carbon dioxides and nitrogen oxides at the outlet of the exhaust line per kilometer, means for calculating a first deviation between target and measured or estimated amounts of nitrogen oxides and means for readjusting a setpoint of the amount of nitrogen oxides per second at the outlet of the exhaust line as a function of this first deviation.

Such an assembly according to an, aspect of the invention enables an injection of reducing agent according to the running conditions relating to the operation of the engine or to the external condition's having an influence on the consumption of reducing agent. This leads to a targeted injection of reducing agent and enables, on the one hand, a saving in the consumption of reducing agent in certain cases while ensuring, on the other hand, an effective depollution of nitrogen oxide's in other cases. The solution is mainly a software solution and does not involve the addition of new elements in the exhaust line.

Advantageously, the line comprises at least one of the following elements: an ammonia probe, an ammonia slip catalyst, one of these elements or these elements being positioned downstream of the selective catalytic reduction system, at least one passive or active sensor of nitrogen oxides positioned downstream of the selective catalytic reduction system, a particulate filter and an oxidation catalyst when the engine is a diesel engine or a three-way catalyst when the engine is a gasoline engine.

BRIEF DESCRIPTION OF THE DRAWINGS

Other features, aims and advantages of aspects of the present invention will become apparent upon reading the detailed description that will follow and upon examining the appended drawings, given by way of nonlimiting examples and in which.

DETAILED DESCRIPTION OF THE PREFERRED EMBODIMENTS

Figure 1:
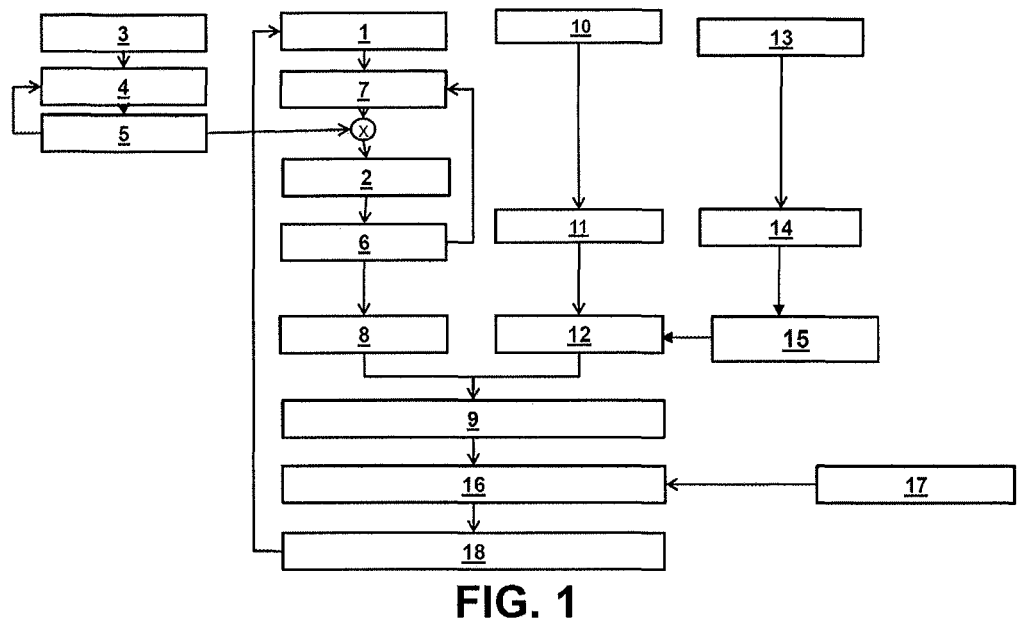
FIG. 1 is a schematic representation of a logic diagram of an embodiment of a process for optimizing a depollution of nitrogen oxides from the gases in an internal combustion engine exhaust line according to an aspect of the present invention.

With reference to FIG. 1, the process for optimizing a depollution of nitrogen oxides from the gases in an internal combustion engine exhaust line of a motor vehicle according to an aspect of the present invention is carried out by a selective catalytic reduction with injection of an amount of reducing agent into the exhaust line.

The optimization process makes it possible to carry out the catalytic, reduction by monitoring a setpoint of the amount of nitrogen oxides per second at the outlet of the exhaust line. The process according to an aspect of the invention repeats steps 1 to 7 from the prior art but adds thereto steps of readjusting the setpoint of the amount of nitrogen oxides per second at the outlet of the exhaust line starting from a mode of monitoring the emissions in grams per kilometer instead of grams per second. Also taken into account is a cumulative production of $CO_2$ in the exhaust line for the determination of the measurement interval and an amount of $NO_x$ in grams produced per kilometer according to the running conditions of the vehicle, which will be defined below, is considered.

As shown in FIG. 1, the readjustment of the setpoint of the amount of nitrogen oxides per second at the outlet of the exhaust line is calculated in 18 and a new setpoint of the amount of nitrogen oxides per second at the outlet of the exhaust line replaces in 1 the old setpoint of the amount of nitrogen oxides at each completion of successive running distance intervals.

The new setpoint may be calculated by increasing or decreasing the previous setpoint, in absolute or relative terms. Its amplitude may be based on at least some of the parameters used to set the target amount of nitrogen oxides per kilometer. The change may also be limited to one zone, given that the $NO_x$ emissions at the outlet of the exhaust line may depend on several parameters, connected to the catalysis 4 such as the temperature, or the exhaust flow rate, the $NO_2$—$NO_x$ ratio, the soot loading, the $NH_3$ loading, etc., and/or on the same parameters used for setting the target amount of nitrogen oxides per kilometer.

The expression of the distance per kilometer is not limiting but is however preferred since it is well suited to the travel of a motor vehicle.

From the speed of the vehicle, referenced 10 in FIG. 1, each distance interval is determined by integration of the speed of the vehicle in a time interval, which is referenced 11.

This time interval ends as soon as a predetermined target cumulative amount of carbon dioxide released in the exhaust line is reached, which is referenced 15 in FIG. 1, it being possible for this target amount of $CO_2$ to be calibrated. The calculation of the cumulative amount of carbon dioxide actually released, referenced 14, may be obtained from the demand for injection of fuel made by the driver, referenced 13, it being possible for this injection demand to be the pressure of his/her foot on an accelerator pedal.

The cumulative amount of carbon dioxide actually released may be calculated from the demand for injection of fuel made by the driver, referenced 13, by mapping established at least as a function of the engine speed and of the demand for injection of fuel by the driver 13 in the calculation step referenced 14. This amount of carbon dioxide actually released is then compared to the predetermined cumulative amount of carbon dioxide, referenced 15.

The distance interval was therefore calculated in 12 from the distance calculated by integration of the distance as was carried out in 11 and of the predetermined target cumulative amount of carbon dioxide calculated in 15 stopping the integration of the distance interval and delimiting the end thereof.

In reference 9, a measured or estimated amount of nitrogen oxides at the outlet of the exhaust line is calculated per kilometer traveled. This amount of nitrogen oxides is calculated for each distance interval calculated in 12 from a measured cumulative amount of nitrogen oxides at the outlet of the exhaust line which was measured in 8 according to a step known from the prior art.

The measured or estimated amount of nitrogen oxides at the outlet of the exhaust line per kilometer traveled, calculated in 9, is compared in 16 with a target amount of nitrogen oxides per kilometer for the calculation of a first deviation. The target amount of nitrogen oxides per kilometer was estimated in reference 17. A first deviation was then obtained at the outlet of step 16 between the measured or estimated amount of nitrogen oxides per kilometer and the target amount of nitrogen oxides per kilometer The deviation mentioned previously in the introductory part of the present application, calculated according to a prior art process in the step referenced 7, will be subsequently referred to as second deviation so as not to be confused with the first deviation, an essential feature of an aspect of the present invention.

The first deviation at the outlet of step 16 is used in step 18 for the calculation of a new setpoint of the amount of nitrogen oxides per second at the outlet of the exhaust line which replaces in 1 the old setpoint of the amount of nitrogen oxides per second at the outlet of the exhaust line used for the calculation of the amount of reducing agent to be injected.

In step 17, the target amount of nitrogen oxides per kilometer may be dependent on at least one of the following parameters: driving style, estimated total weight of the vehicle, use of additional equipment in the vehicle such as air conditioning, road profile, engine temperature and in particular coolant temperature, vehicle speed, combustion mode and atmospheric conditions such as the outside temperature, the ambient pressure, the wind and/or the altitude. The use of parameters other than those mentioned above is also possible.

The target amount of nitrogen oxides, advantageously expressed in grams per kilometer, may be deduced from the use of several mappings including correction factors that are dependent on the parameters mentioned above.

One mode of use of the process for optimizing a depollution of nitrogen oxides from the gases in an exhaust may be carried out within the context of a real driving emissions test. In this case, according to the test, a monitoring of the nitrogen oxide emissions may be carried out for evaluation windows spreading over a predetermined running distance. The successive running distance intervals calculated during the process according to an aspect of the invention may be between a twentieth and a tenth of the predetermined running distances of the evaluation windows.

This is therefore carried out with distance intervals having a smaller number of kilometers traveled than that of the evaluation windows. This enables a readjustment of the setpoint of the amount of nitrogen oxides per second at the outlet of the exhaust line during this test for a better adjustment of the monitoring-control of the amount of reducing agent injected during this test. An evaluation window may for example be from 10 to 20 km and a distance interval from 0.5 to 2 km. This adjustment of the distance intervals may be carried out by calibration of the target cumulative amount of carbon dioxide released in the exhaust line as a function of the evaluation windows in order to always have distant intervals smaller than the evaluation windows.

The cumulative amount of carbon dioxide released in the exhaust line may be reset to zero at the beginning of each running distance interval. This is done after the end of a distance interval performed in reference 12.

As was mentioned in the prior art, which is also used in an aspect of the present invention, which is referenced 3, the amount of reducing agent injected may be calculated according to parameters of the exhaust line and/or of combustion in the internal combustion engine. Without being limiting, these parameters may be, taken individually or in combination: the measured or estimated amount of nitrogen oxides upstream of the injection of reducing agent, the temperature in the exhaust line, the gas flow rate in the exhaust line and the catalysis model which is referenced as 4. Furthermore, as is shown in reference 5, the calculation of the amount of reducing agent may be carried out in an open loop.

In combination and at the same time as the readjustment of the setpoint of the amount of nitrogen oxides per second at the outlet of the exhaust line that an aspect of the present invention carries out, for a same setpoint of the amount of nitrogen oxides per second at the outlet of the exhaust line, the calculation of a second deviation between the setpoint of the amount of nitrogen oxides per second and a measured or estimated amount of nitrogen oxides at the outlet of the exhaust line per second may be carried out. The amount of reducing agent injected may be corrected according to the second deviation. This was described in detail in the introductory part of the present application and related to steps 2, 6 and 7.

Thus an aspect of the present invention, in a preferred mode, retains the correction mode disclosed by the prior art which is advantageously carried out every second or every group of several seconds but adds thereto a monitoring of the amount of nitrogen oxides per kilometer by taking into account the running conditions, hitherto not taken into consideration by the prior art, for a readjustment of the setpoint of the amount of nitrogen oxides per second at the outlet of the exhaust line.

An aspect of present invention also relates to an assembly of an exhaust line and of a depollution monitoring-control unit. In this assembly, the exhaust line comprises a selective catalytic reduction system with injection of reducing agent into the line. The monitoring-control unit receives the estimates or measurements of amounts of nitrogen oxides exiting via the exhaust line at least downstream of the selective catalytic reduction system. It is preferred, but not limiting, that the amounts of nitrogen oxides be measured by an $NO_x$ sensor downstream of the SCR system substantially at the end of the exhaust line.

According to an aspect of the invention, for the implementation of a process for optimizing the amount of reducing agent injected as described above, the monitoring-control unit comprises means for integrating the speed of the vehicle in order to determine a distance interval, means for estimating or calculating a cumulative amount of carbon dioxide released into the exhaust line. This calculation may be carried out according to a mapping.

These means are means for prior storage of target amounts of carbon dioxide and nitrogen oxides at the outlet of the exhaust line per kilometer, means for calculating a first deviation between target and measured or estimated amounts of nitrogen oxides and means for readjusting a setpoint of the amount of nitrogen oxides per second at the outlet of the exhaust line as a function of this first deviation.

The monitoring-control unit may comprise or be combined with one or more mappings, in particular a mapping established at least as a function of the engine speed and of the demand for injection of fuel by the driver, for estimating the amount of carbon dioxide released and optionally the amount of nitrogen oxides at the outlet of the exhaust line, although a measurement by a nitrogen oxide sensor is preferred.

It should be kept in mind that the SCR system has an actual monitoring-control unit and that this unit can undertake the monitoring of the process according to an aspect of the invention instead of or in addition to a monitoring-control unit of the exhaust line.

The line may comprise at least one of the following elements: an ammonia probe, an ammonia slip catalyst, one of these elements or these elements being positioned downstream of the selective catalytic reduction system, the excess ammonia having to be neutralized instead of being released into the atmosphere, at least one passive or active nitrogen oxide trap, at least one passive or active nitrogen oxide sensor positioned downstream of the selective catalytic reduction system, a particulate filter and an oxidation catalyst when the engine is a diesel engine or a three-way catalyst when the engine is a gasoline engine.

le;.5qThe $NH_3$ probe may have an additional function than the monitoring of the depollution of $NH_3$. Specifically, the integration of an NOR sensor at the outlet of the exhaust line may take into account the potential presence of $NH_3$ under certain conditions, owing to the fact that the NOR sensor may have a sensitivity to $NH_3$ and may therefore distort its measurement relative to the amount of NOR. This may be achieved by addition of an additional $NH_3$ probe that is used for the depollution of $NH_3$ with a function of detecting $NH_3$ useful for the calculation of the amount of NOR at the outlet of the exhaust line.

Specifically, certain NOR sensors with a sensitivity to $NH_3$ may lead to a less accurate evaluation of the NOR at the outlet of the exhaust line since it is overestimated by the presence of $NH_3$. However, with the use of the optimization process according to an aspect of the present invention, an excess of $NH_3$ not used for the catalysis ought to be considerably reduced by the implementation of the process according to an aspect of the present invention.

Figure 2:
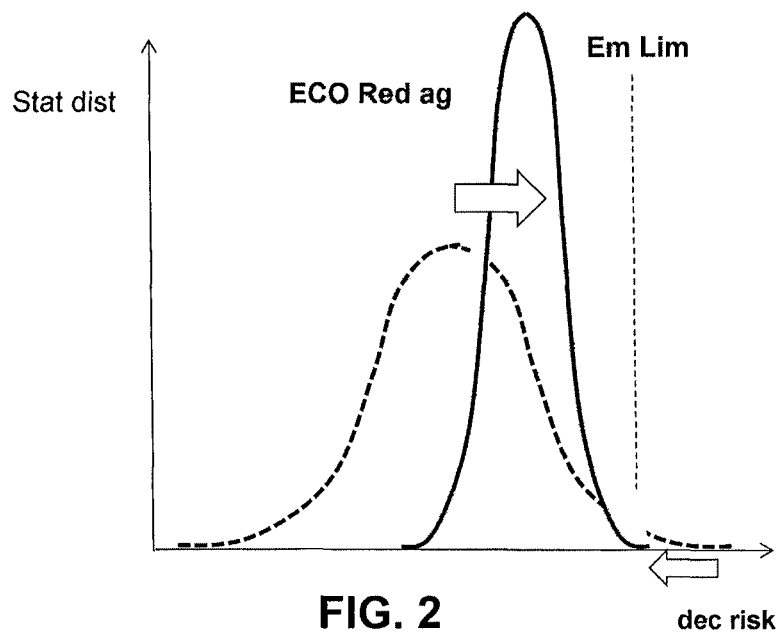
FIG. 2 is a schematic representation of two distribution curves, respectively according to an aspect of the invention as a solid line and according to the prior art as dotted lines, of monitorings of nitrogen oxides at the outlet of a motor vehicle exhaust line.

FIG. 2 shows a statistical distribution "Stat dist" of the NOR emission controls during evaluation windows for a process in accordance with the prior art along a dotted-line curve and a process in accordance with an aspect of the present invention along a solid-line curve. A vertical asymptote symbolizes the tolerable emission limit "Em Lim" not to be exceeded.

The application of a process according to an aspect of the present invention gives a statistical distribution "Stat dist" with a narrow standard deviation compared to a process from the prior art. This is expressed by a reduction in the consumption of reducing agent symbolized by the highest arrow "Eco Red ag" pointing to the right. The statistical distribution according to an aspect of the present invention is nullified before the tolerable emission limit "Em Lim" unlike the statistical distribution of the prior art. There is therefore a decrease in the risk of exceeding the tolerable emission limit "Em Lim", which is illustrated by the arrow "dec risk" pointing to the left.

The table below gives a comparison between a basic scenario and three scenarios. The first scenario corresponds to an increased production of $CO_2$ in the flow "$CO_2$/flow+", the second scenario corresponds to an increased mass of the vehicle "mass +", an increased production of $CO_2$ in the flow "$CO_2$/flow+" and a speed that is reduced or remains constant "V−=". The third scenario corresponds to aggressive driving "Agg driv", an increased production of $CO_2$ in the flow "$CO_2$/flow+" and a speed that is increased or remains constant "V=+".

The amount of $CO_2$ or $CO_2$ test is given in grams per kilometer or g/km. The $CO_2$ window gives the mass of $CO_2$. The real $CO_2$ is the percentage of $CO_2$. "c real NON" is the calculated real amount of NO in milligrams per second or mg/sec. "Real flow" and "real v" are respectively the flow rate in the exhaust line in kilograms per hour and the speed of the vehicle in kilometers per hour, "win" indicating an evaluation window expressed either in kilometers or in minutes. "$NO_x$ Res" is the $NO_x$ result expressed in milligrams per kilometer or mg/km for the four scenarios. These results vary as a function of the conditions of each scenario.

If the amount of $CO_2$ increases over a short distance, there is no impact on the amount of $NO_x$ per kilometer. If the amount of $CO_2$ increases as well as the exhaust gas flow rate, there is no impact on the amount of $NO_x$ per kilometer.

If the average speed of the vehicle decreases, there is an increase in the amount of $NO_x$ per kilometer and therefore the amount of reducing agent calculated by the prior art to be injected is not sufficient.

In the case of aggressive driving, the amount of $CO_2$ and the exhaust gas flow rate increase. There is no impact on the amount of $NO_x$ per kilometer. If the average speed of the vehicle increases, there is a decrease in the amount of $NO_x$ per kilometer and therefore the amount of reducing agent calculated by the prior art to be injected is too high compared to the amount actually needed.

| Base | | mass+, $CO_2$/flow+, V−= | |
|---|---|---|---|
| 125 g/km | $CO_2$ test | 125 g/km | $CO_2$ test |
| 1250 g | $CO_2$ win | 1250 g | $CO_2$ win |
| 10% | real $CO_2$ | 12% | real $CO_2$ |
| 1.55 mg/sec | c real $NO_x$ | 1.55 mg/sec | c real $NO_x$ |
| 50 kg/h | real flow | 60 kg/h | real flow |
| 70 km/h | real v | 68 km/h | real v |
| 2.11 g/sec | real $CO_2$ | 3.03 g/sec | real $CO_2$ |
| 9.9 min | win | 6.9 min | win |
| 11.5 km | win | 7.8 km | win |
| 0.92 g | $NO_x$ win | 0.64 g | $NO_x$ win |
| 80 mg/km | $NO_x$ Res | 82 mg/km | $NO_x$ Res |
| $CO_2$/flow+ | | Agg driv, $CO_2$/flow+, V=+ | |
| 125 g/km | $CO_2$ test | 125 g/km | $CO_2$ test |
| 1250 g | $CO_2$ win | 1250 g | $CO_2$ win |
| 12% | real $CO_2$ | 12% | real $CO_2$ |
| 1.55 mg/sec | c real $NO_x$ | 1.55 mg/sec | c real $NO_x$ |
| 60 kg/h | real flow | 60 kg/h | real flow |
| 70 km/h | real v | 72 km/h | real v |
| 3.03 g/sec | real $CO_2$ | 3.03 g/sec | real $CO_2$ |
| 6.9 min | win | 6.9 min | win |
| 8.0 km | win | 8.2 km | win |
| 0.64 g | $NO_x$ win | 0.64 g | $NO_x$ win |
| 80 mg/km | $NO_x$ Res | 78 mg/km | $NO_x$ Res |

The invention claimed is:

1. A process for optimizing a depollution of nitrogen oxides from the gases in an internal combustion engine exhaust line of a motor vehicle, the depollution of nitrogen oxides being carried out according to a selective catalytic reduction by injection of a quantity of reducing agent into the line making it possible to monitor a setpoint of an amount of nitrogen oxides per second at an outlet of the exhaust line, the process comprising:
readjusting the setpoint of the amount of nitrogen oxides per second at the outlet of the exhaust line is made at each completion of successive running distance intervals, each distance interval being determined by integration of a speed of the vehicle over a time interval that ends as soon as a predetermined target cumulative amount of carbon dioxide released in the exhaust line is reached,
calculating an amount of nitrogen oxides at the outlet of the exhaust line per kilometer traveled for each interval from a cumulative amount of nitrogen oxides measured at the outlet of the exhaust line and compared with a target amount of nitrogen oxides per kilometer for the calculation of a first deviation that is used for the readjustment of the setpoint of the amount of nitrogen oxides per second at the outlet of the exhaust line.

2. The process as claimed in claim 1, wherein the target amount of nitrogen oxides per kilometer is dependent on at least one of the following parameters: driving style, estimation of the total weight of the vehicle, use of additional equipment in the vehicle, road profile, engine temperature or coolant temperature, vehicle speed, combustion mode and atmospheric conditions such as outside temperature, ambient pressure, wind and/or altitude.

3. The process as claimed in claim 1, wherein a cumulative amount of carbon dioxide is estimated by mapping established at least as a function of the engine speed and of a demand for injection of fuel by the driver and is compared to the predetermined cumulative amount of carbon dioxide.

4. The process as claimed in claim 1, wherein a monitoring of the nitrogen oxide emissions is carried out for evaluation windows over a predetermined running distance, the successive running distance intervals being between a twentieth and a tenth of the predetermined running distances of the evaluation windows.

5. The process as claimed in claim 1, wherein the cumulative amount of carbon dioxide released in the exhaust line is reset to zero at the beginning of each running distance interval.

6. The process as claimed in claim 1, wherein the amount of reducing agent injected is calculated according to parameters of the exhaust line and/or of combustion in the internal combustion engine taken individually or in combination such as the amount of nitrogen oxides measured or estimated upstream of the injection of reducing agent, the temperature in the exhaust line, the gas flow rate in the exhaust line and the catalysis model.

7. The process as claimed in claim 6, wherein the calculation of the amount of reducing agent is carried out in an open loop.

8. The process as claimed in claim 7, wherein, at the same time as the readjustment of the setpoint of the amount of nitrogen oxides per second at the outlet of the exhaust line, for a same setpoint of the amount of nitrogen oxides per second at the outlet of the exhaust line, the calculation of a second deviation between the setpoint of the amount of nitrogen oxides per second and a measured or estimated amount of nitrogen oxides at the outlet of the exhaust line per second is carried out, the amount of reducing agent injected also being corrected according to this second deviation.

9. An assembly of an exhaust line and of a depollution monitoring-control unit, the exhaust line comprising:
a selective catalytic reduction system with injection of a reducing agent into the line,
a monitoring-control unit receiving estimates or measurements of amounts of nitrogen oxides at an outlet of the exhaust line at least downstream of a selective catalytic reduction system, wherein the monitoring-control unit carries out a process for optimizing an amount of reducing agent injected, the monitoring-control unit comprising means for integrating a speed of the vehicle in order to determine a distance interval, means for estimating or calculating a cumulative amount of carbon dioxide released in the exhaust line, means for prior storage of target amounts of carbon dioxide and nitrogen oxides at the outlet of the exhaust line per kilometer, means for calculating a first deviation between target and measured or estimated amounts of nitrogen oxides and means for readjusting a setpoint of the amount of nitrogen oxides per second at the outlet of the exhaust line as a function of this first deviation.

10. The assembly as claimed in claim 9, wherein the line comprises at least one of the following elements: an ammonia probe, an ammonia slip catalyst, one of these elements or these elements being positioned downstream of the selective catalytic reduction system, at least one passive or active sensor of nitrogen oxides positioned downstream of the selective catalytic reduction system, a particulate filter and an oxidation catalyst when the engine is a diesel engine or a three-way catalyst when the engine is a gasoline engine.

11. The process as claimed in claim 2, wherein a cumulative amount of carbon dioxide is estimated by mapping established at least as a function of the engine speed and of a demand for injection of fuel by the driver and is compared to the predetermined cumulative amount of carbon dioxide.

12. The process as claimed in claim 2, wherein the additional equipment in the vehicle is an air conditioner.

13. The process as claimed in claim 6, wherein, at the same time as the readjustment of the setpoint of the amount of nitrogen oxides per second at the outlet of the exhaust line, for a same setpoint of the amount of nitrogen oxides per second at the outlet of the exhaust line, the calculation of a second deviation between the setpoint of the amount of nitrogen oxides per second and a measured or estimated amount of nitrogen oxides at the outlet of the exhaust line per second is carried out, the amount of reducing agent injected also being corrected according to this second deviation.

* * * * *